United States Patent [19]

Bernard et al.

[11] 4,113,011

[45] Sep. 12, 1978

[54] ENHANCED OIL RECOVERY PROCESS

[75] Inventors: George G. Bernard, La Mirada; LeRoy W. Holm, Fullerton, both of Calif.

[73] Assignee: Union Oil Company of California, Brea, Calif.

[21] Appl. No.: 774,920

[22] Filed: Mar. 7, 1977

[51] Int. Cl.² .............................................. E21B 43/22
[52] U.S. Cl. .................................. 166/273; 166/274; 252/8.55 D
[58] Field of Search ................. 252/8.55 D; 166/273, 166/274

[56] References Cited

U.S. PATENT DOCUMENTS

| 3,084,743 | 4/1963 | West et al. | 166/274 |
|---|---|---|---|
| 3,330,346 | 7/1967 | Jacobs et al. | 252/8.55 X |
| 3,342,256 | 9/1967 | Bernard et al. | 166/273 |
| 3,391,750 | 7/1968 | Zika | 252/8.55 X |
| 3,500,923 | 3/1970 | Reisberg | 252/8.55 X |
| 3,529,668 | 9/1970 | Bernard | 166/273 |
| 3,620,304 | 11/1971 | Hearn | 166/274 |
| 3,623,552 | 11/1971 | Vairogs | 166/274 |
| 3,653,440 | 4/1972 | Reisberg | 166/273 |
| 3,811,502 | 5/1974 | Burnett | 166/273 X |
| 3,893,511 | 7/1975 | Root | 166/274 X |

OTHER PUBLICATIONS

Holm et al., Article in Journal of Petroleum Technology, Dec., 1974, pp. 1427–1437.

Primary Examiner—Herbert B. Guynn
Attorney, Agent, or Firm—Richard C. Hartman; Dean Sandford; Daniel R. Farrell

[57] ABSTRACT

An enhanced oil recovery process employing an aqueous alkyl polyethylene oxide sulfate solution and a carbon dioxide displacement fluid at injection pressures above about 1,500 p.s.i. The aqueous solution of an alkyl polyethylene oxide sulfate having 8 or 9 carbon atoms in the alkyl group and between 1 and 5 ethoxy groups significantly improves the areal sweep and overall efficiencies of dense fluid carbon dioxide enhanced oil recovery processes, especially under high salinity and low pH conditions. The efficiency of the process is increased as the injection pressure is increased.

18 Claims, 2 Drawing Figures

ENHANCED OIL RECOVERY PROCESS

BACKGROUND OF THE INVENTION

1. Field of the Invention

This invention relates to the recovery of oil from subterranean reservoirs and more particularly concerns an improved process for recovering oil from porous reservoirs wherein carbon dioxide is used as a dense fluid displacement slug.

2. Description of the Prior Art

Enhanced recovery of petroleum by the injection of carbon dioxide into an input well and withdrawal of reservoir fluids from a producing well has long been known and practiced. Carbon dioxide has been used alone at high pressures wherein significant oil recoveries have been obtained. Such a process is described by Whorton et al. in U.S. Pat. No. 2,623,596. It was later discovered that the recovery of petroleum with carbon dioxide could be greatly increased if the carbon dioxide was used in slug form and driven through the reservoir by an aqueous drive fluid such as brine, water or carbonated water. A typical process in which carbon dioxide is driven through the reservoir by an aqueous fluid is fully described in Holm, U.s. Pat. No. 3,065,790. Next, Bernard et al. in U.S. Pat. No. 3,342,256 disclosed the improvement of an enhanced oil recovery process using carbon dioxide by incorporating a surface-active agent or surfactant prior to or with the carbon dioxide displacement slug. And Bernard in U.S. Pat. No. 3,529,668 disclosed a foam drive oil recovery process in which an aqueous surfactant solution is driven through the reservoir by alternating slugs of gas and aqueous drive fluids in certain critical proportions.

Copending application Ser. No. 767,529 filed Feb. 10, 1977 disclosed a carbon dioxide foam flooding process employing an alkali metal salt of an alkyl sulfocarboxylic acid as the foaming agent. Jacobs et al. disclose in U.S. Pat. No. 3,330,346 the use of an alkyl polyethylene oxide sulfate having between about 10 and about 16 carbon atoms in the alkyl group, such as the commercial detergent product marketed by Proctor & Gamble Company under the trademark "OK Liquid." However, aqueous solutions of these preferred foaming agents undesirably precipitate solids upon exposure to highly saline formation fluids.

It has been found that in spite of the wide variety of foaming agents known for foaming aqueous base media, the combination of carbon dioxide, brine, and formation constituents present many problems in the use of foaming agents in a displacement fluid in enhanced oil recovery processes. The mixture of carbon dioxide and formation fluids often constitutes an acidic and highly saline composition. Many foaming agents are not stable in acidic media and tend to decompose. Most of the foaming agents which are stable in low salinity acidic media become less stable or even decompose in highly saline acidic media. Although many foaming agents satisfactorily foam carbon dioxide at atmospheric pressure and low temperatures, in the low pH and high salinity conditions encountered in many formations, most foaming agents are rendered ineffectual. Furthermore, some carbon dioxide oil recovery processes have been conducted at high formation pressures, wherein the expansion of the carbon dioxide fluid is slight and the foaming agents tested have contributed very little to the efficiency of the process. There exists a need for an improved enhanced oil recovery process using carbon dioxide at high pressures especially in reservoirs of high salinity and low pH.

Accordingly, it is a primary object of this invention to provide an improved carbon dioxide enhanced oil recovery process by which greater quantities of oil can be produced.

Another object of this invention is to provide a high pressure carbon dioxide enhanced oil recovery process in which greatly enhanced areal sweep efficiencies of high salinity and low pH reservoirs are obtained.

Still another object of this invention is to more effectively utilize the carbon dioxide used in a carbon dioxide enhanced oil recovery process.

Other objects and advantages of this invention will become apparent to those skilled in the art from the following description.

SUMMARY OF THE INVENTION

Briefly, the invention provides a method for recovering oil from a subterranean formation in which an aqueous solution of an alkyl polyethylene oxide sulfate having 8 or 9 carbon atoms in the alkyl group and between 1 and 5 ethoxy units is injected into the formation and displaced therethrough by at least one slug of carbon dioxide and preferably a drive fluid at an injection pressure above about 1,500 p.s.i. The drive fluid can be an aqueous fluid such as brine, water or carbonated water, or can consist of alternating slugs of a normally gaseous fluid and an aqueous fluid. The pressure is advantageously maintained above the miscible-displacement pressure but below the fracture pressure of the formation.

The method of this invention is substantially more efficient than prior art carbon dioxide enhanced oil recovery methods when employed to treat subterranean reservoirs under high salinity and low pH conditions.

DETAILED DESCRIPTION OF THE INVENTION

Figure 1:
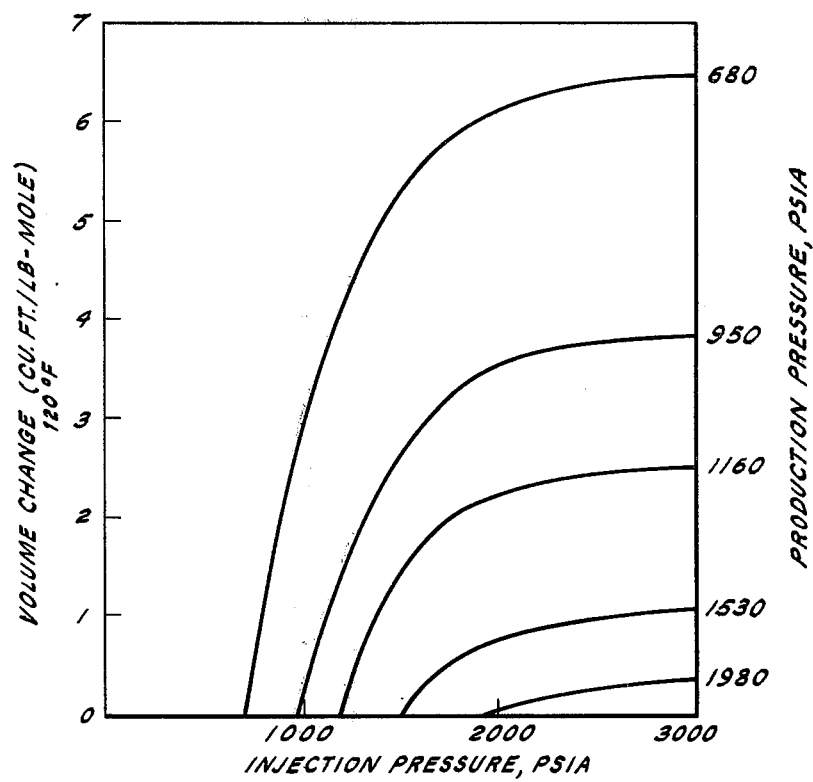
FIG. 1 is a graphical representation illustrating the experimentally determined volume change of a carbon dioxide/methane mixture as a function of the injection and production pressures.

It has been discovered that the use of alkyl polyethylene oxide sulfates having 8 or 9 carbon atoms in the alkyl group and between 1 and 5 ethoxy units substantially improves the areal sweep efficiency and overall efficiency of enhanced oil recovery processes employing carbon dioxide as a dense phase displacement fluid when applied to subterranean reservoirs under high salinity and low pH conditions. The amount of carbon dioxide required to obtain high oil efficiencies is decreased inasmuch as the use of alkyl polyethylene oxide sulfates apparently causes the carbon dioxide to be more confined to the zone of interest and more effectively prohibits the carbon dioxide from channeling through the high permeability strata than the use of the various foaming agents employed in the carbon dioxide flooding methods of the prior art.

It is well known that the solubility characteristics of carbon dioxide have a distinct effect on oil recoveries when the carbon dioxide is at pressures in excess of about 700 p.s.i. At these high pressures, carbon dioxide exists as a dense fluid or liquid, rather than as a gas, even the critical temperature of carbon dioxide is about 89° F. That is to say, carbon dioxide has not been liquefied at temperatures above 89° F., regardless of the pressures applied. However, below 89° F., carbon dioxide exists either as a gas, a dense fluid or a liquid, depending on the pressures applied. Inasmuch as the typical pressures employed in enhanced oil recovery when carbon dioxide is used are in excess of 700 p.s.i., and for the method of this invention in excess of about 1,500 p.s.i., and the temperatures below about 200° F., the carbon dioxide exists as a dense fluid, rather than as a gas, and in most typical situations where the reservoir temperature is below about 89° F., the carbon dioxide exists as a liquid. A dense fluid is more like a liquid than a gas, as evidenced by the low compressibility of such fluids, i.e., the change in density as a function of increased pressure is very slight.

The amount of the carbon dioxide injected into the formation will of course vary for different formations, and will be dependent upon total reservoir pore volume, hydrocarbon pore volume, and other unique formation characteristics. However, as used herein, the term "effective pore volume" is meant to mean that portion of the reservoir which is expected to be contacted by the carbon dioxide injected. Effective pore volume is determined by conventional laboratory and field techniques which are well known in the art of petroleum engineering.

In carrying out the process of this invention, a slug of the aqueous surfactant solution is injected into the formation and displaced therethrough by a carbon dioxide dense fluid at a bottom hole injection pressure above about 1,500 p.s.i. The aqueous surfactant solution slug should be between about 0.001 to about 1.0 effective pore volume, and excellent results are obtained with from about 0.02 to about 0.2 effective pore volume slugs. The carbon dioxide dense fluid can be used alone to displace the aqueous surfactant solution, or, preferably, one or more slugs containing 0.01 to about 1 effective pore volume of the carbon dioxide dense fluid are driven through the formation by a drive fluid. The drive fluid may be water, brine or carbonated sufficient in quantity to drive the carbon dioxide through the reservoir from the injection well to a production well. Alternatively, the drive fluid can be a series of alternating slugs of water, brine or carbonated water and a normally gaseous medium, such as disclosed in U.S. Pat. No. 3,529,668. Preferably the alternate aqueous slugs of the drive fluid contain between about 0.05 and about 5 weight percent of the alkyl polyethylene oxide sulfate surfactant.

The term "injection pressure" as used herein is meant to define the pressure at which the displacement fluids enter the formation, i.e., the pressure at a point in the well bore adjacent to the formation. The pressure at which the fluids are injected into the well equipment is generally lower than the pressure in the formation adjacent the well bore. The injection pressure of the displacement fluids is maintained above about 1,500 p.s.i. Particularly good oil recoveries are obtained when the injection pressure is maintained above about 2,000 p.s.i. and preferably the injection pressure is maintained above about 2,500 p.s.i. but below the fracture pressure of the formation. The preferred injection pressure is that which achieves an economic balance between oil recovery and operational expense.

The aqueous surfactant solution is prepared from fresh water, brine, or carbonated water. Preferably the water available at the injection well site, usually the brine employed in the drive fluid, is employed to prepare the aqueous surfactant solution.

The aqueous surfactant solution contains between about 0.01 to about 10 weight percent, more preferably between about 0.1 and about 5 weight percent, and most preferably about 1.0 weight percent, of an alkyl polyethylene oxide sulfate surfactant characterized by the generalized formula

$$C_xH_{2x+1}(OCH_2CH_2)_yOSO_3M$$

wherein $x$ is an integer having a value of 8 or 9, $y$ is an integer having a value of from 1 to 5, and M is a cation. In a preferred embodiment, the cation M is sodium, potassium or ammonium and $y$ is an integer having a value of 2 or 3. Exemplary of one particularly preferred material is ammonium nonyl triethylene oxide sulfate. Another particularly preferred material is ammonium nonyl diethylene oxide sulfate.

While the process of this invention is entirely operable using a single alkyl polyethylene oxide sulfate, such as the aforementioned ammonium nonyl triethylene oxide sulfate, commercial materials of the foregoing type are generally available as mixed salts having alkyl chains of varying lengths and/or which are ethoxylated in varying degrees. Thus it is within the scope of this invention to employ as the surfactant mixed alkyl polyethylene oxide sulfates having alkyl chains which contain between 8 to 9 carbon atoms, and having varying degrees of ethoxylation, between about 1 to 5 ethoxy groups per molecule. Also, the surfactant can be an admixture of the sodium, potassium and ammonium salts of the alkyl polyethylene oxide sulfate.

The alkyl polyethylene oxide sulfates useful in the practice of this invention are for the most part viscous liquids having molecular weights in the range of from about 290 to about 530. The commercial product is generally available as an aqueous solution containing from about 20 to about 80 percent active component. While for the most part the alkyl polyethylene oxide sulfates are soluble in water, solubilization is improved by the addition of a minor portion of a low molecular weight alcohol such as methyl, ethyl or isopropyl alcohol. An aqueous-alcoholic solution of a preferred alkyl polyethylene oxide sulfate is marketed by the GAF Corporation under the trademark Alipal CD-128. The commercial product Alipal CD-128 is a solution of about 60 percent mixed ammonium alkyl polyethylene oxide sulfates, about 35 to about 38 percent water, and about 2 to about 5 percent alcohol.

The enhanced oil recovery method of this invention can be successfully applied to formations having relatively low concentrations of salt, such as less than 1 percent. However, the method is especially useful in formations having high concentrations of salt, such as above about 3 percent. Good results are obtained in applying this method to formations with salt concentrations above about 10 percent.

Similarly the method of this invention can be successfully applied to the formations of varying pH conditions. The method is successful in treating formations of pH from about 2 to about 9. It should be noted that the injection of carbon dioxide generally lowers the pH of the formation fluids.

Furthermore, the alkyl polyethylene oxide sulfates useful in this invention are relatively insensitive to formation constituents, such as clay, silica, and the like. The success of the enhanced oil recovery process of this invention, relative to the prior art processes, increases as the reservoir conditions become less favorable, i.e., as the salinity is increased, the pH lowered, the pressure increased, and the concentration of adverse formation constituents increases. The process of this invention is, however, also useful in reservoirs exhibiting relatively favorable conditions of low salinity and moderate pH.

The reason for the superior results obtained by the method of this invention is not fully understood. Previous studies on the oil recovery efficiencies of high pressure carbon dioxide flooding processes [cf. Holm et al., "Mechanism of Oil Displacement by Carbon Dioxide," Journal of Petroleum Technology, December 1974, pp. 1427-1438] demonstrated the advantages of maintaining the carbon dioxide at a pressure above the pressure required for miscible-displacement of the reservoir oil by carbon dioxide. This "miscible-displacement pressure" depends on the hydrocarbon type, formation temperature, and other formation conditions, but is generally between about 1,000 and about 2,000 p.s.i. These studies demonstrated no advantage for maintaining formation pressures higher than just above the miscible-displacement pressure. It has now been discovered that the injection of an aqueous solution of the above-described alkyl polyethylene oxide sulfates, prior to the carbon dioxide slug, renders the oil recovery efficiency method sensitive to the formation pressure. Specifically, the areal sweep and overall efficiencies of the method unexpectedly increase as the formation pressure is increased.

Previously, the efficiency improvement due to the incorporation of a foaming agent prior to the carbon dioxide displacement fluid was attributed to the establishment of foam when the fluid pressure was suddenly decreased, as occurs when highly permeable strata are encountered. The carbon dioxide was thought to expand and foam the foaming agent solution, the established foam bank restricting the flow of displacement fluids through the highly permeable strata and diverting the displacement fluid to less permeable strata, thereby increasing the areal sweep efficiency. However, at formation pressures in excess of about 1,500 p.s.i., the pressure drop encountered at even highly permeable strata is not sufficient to allow significant expansion of the carbon dioxide displacement fluid. Without significant expansion, there can be no foam formation and consequently the beneficial diverting effect of the foam as previously envisioned can not occur. At formation pressures significantly above the miscible-displacement pressure, the incorporation of a foaming agent would therefore be expected to be at most of minimal benefit.

FIG. 1 illustrates the volume change, or expansion, in cubic feet per pound-mole of a carbon dioxide/methane mixture as a function of the injection pressure and the production pressure at a constant temperature of 120° F. The composition of the mixture is listed in Table 1 below and is typical of produced carbon dioxide available for use in carbon dioxide enhanced oil recovery processes.

TABLE 1

| Component | Mole Percent | Component | Mole Percent |
|---|---|---|---|
| $N_2$ | 0.04 | $C_3$ | 0.10 |
| $CO_2$ | 89.94 | $nC_4$ | 0.06 |
| $C_1$ | 9.44 | $nC_5$ | 0.05 |
| $C_2$ | 0.21 | $nC_6$ | 0.16 |

Average molecular weight = 41.41.

The data in the Table and FIG. 1 are based on data reported in "Application of Compressibility Factors for High Ratio Carbon Dioxide-Methane Gas Mixtures" by Fesmire et al. and published as SPE 5052 by the Society of Petroleum Engineers of A.I.M.E.

FIG. 1 illustrates several significant features of the carbon dioxide/methane mixture. The volume change between 1,500 p.s.i. and any higher pressure is very small relative to volume changes between 1,500 p.s.i. and lower pressures, as evidenced by the leveling of the constant production pressure curves at about 1,500 p.s.i., since the density of the mixture is rapidly approaching its upper limit.

FIG. 1 also illustrates that for a given injection pressure, the volume change of the fluid increases as the production pressure is decreased. For example, at an injection pressure of 2,000 p.s.i. and a production pressure of 1,500 p.s.i. the volume change is about 0.8 cubic feet per pound-mole as compared to 3.1 cubic feet per pound-mole for a production pressure of 1,000 p.s.i. However, at injection pressures above about 1,500 p.s.i. the volume change for any given production pressure is approximately the same. For example, the volume change between an injection pressure of 3,000 p.s.i. and a production pressure of 1,500 p.s.i. is about 1.1 cubic feet per pound-mole which is only slightly more than the 0.8 cubic feet per pound-mole volume change between an injection pressure of 2,000 p.s.i. and a production pressure of 1,500 p.s.i.

These properties of carbon dioxide mixtures are known and are consistent with the theories on the efficiency improvement due to the incorporation of a foaming agent prior to the carbon dioxide displacement fluid, but do not adequately explain the efficiency improvement at injection pressures above about 1,500 p.s.i. obtained by the method of this invention.

This invention is further illustrated by the following examples which are illustrative of specific modes of practicing the invention and are not intended as limiting the scope of the invention as defined by the appended claims.

EXAMPLES 1-3

A carbonate core is prepared to simulate a brine flooded carbonate reservoir, as follows:

The dry core is saturated with synthetic brine; the core is then saturated with crude oil; and the core is flooded with the synthetic brine until the residual oil saturation is reduced to about 25 percent. Three high pressure carbon dioxide flooding tests are made. After each test the core is cleaned with solvents, brine and fresh water in order to return it to its initial state. During each test at 135° F., a one pore volume slug of synthetic brine containing the amount of foaming agent indicated in Table 2 is displaced through the core by a synthetic carbon dioxide/methane mixture approximating the mixture listed in Table 1. The results of these tests are reported in Table 2 and graphically illustrated in FIG. 2.

TABLE 2

| Ex. | Foaming Agent | Concentration Wt. % | Pressure, p.s.i. Injection | Pressure, p.s.i. Production | Oil Recovered After 0.5 PV of $CO_2$, % O-I-P[1] |
|---|---|---|---|---|---|
| 1 | Alipal CD-128[2] | 0.1 | 2500 | 2450 | 28 |
| 2 | None | — | 2500 | 2450 | 18.5 |
| 3 | Alipal CD-128[2] | 0.1 | 3050 | 2950 | 59.5 |

[1]Volume percent of oil-in-place.
[2]Alkyl polyethylene oxide sulfate marketed by the GAF Corporation under the trademark Alipal CD-128

Figure 2:
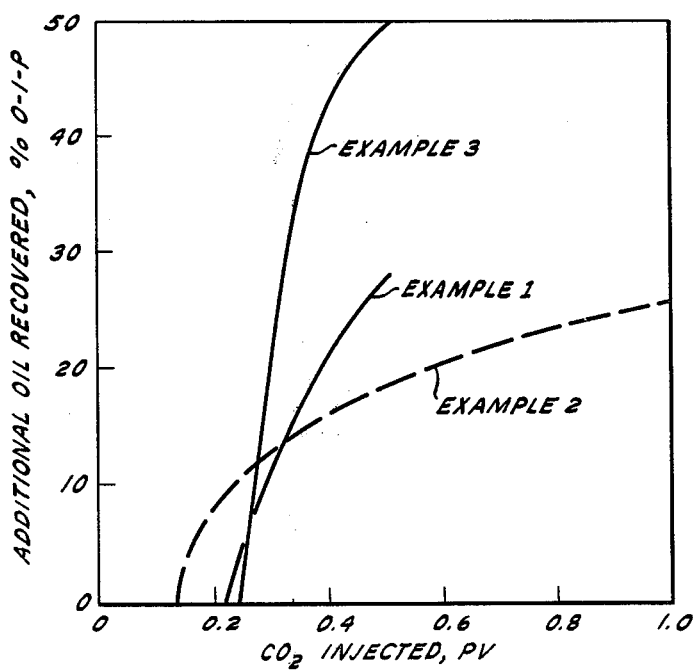
FIG. 2 is a graphical representation illustrating the amount of additional oil recovered as a function of the amount of carbon dioxide injected for two embodiments of the enhanced oil recovery method of this invention as compared to a prior art method.

Referring to FIG. 2, the curves of Examples 1 and 2 are directly comparable and demonstrate the unexpected improvement due to incorporation of the foaming agent at 2,500 p.s.i. The improvement occurs despite the fact that the carbon dioxide/methane mixture expands very little between 2,500 p.s.i. and 2,450 p.s.i.

The curves of Examples 1 and 3 are directly comparable and demonstrate the improvement in oil recovery at the higher formation pressure despite the fact that the expansion of the displacement fluid between 3,050 and 2,950 p.s.i. is approximately the same as the expansion between 2,500 and 2,450 p.s.i.

While the particular embodiments of the invention have been described, it will be understood, of course, that the invention is not limited thereto since many obvious modifications can be made, and it is intended to include within this invention any such modifications as will fall within the scope of the appended claims.

Having now described the invention, we claim:

1. In a method for the recovery of oil from subterranean oil-bearing formations wherein carbon dioxide is injected into the formation at pressures above the miscible-displacement pressure to miscibly displace said oil to a recovery well, the improvement which comprises:
injecting into said formation not later than the injection of said carbon dioxide an aqueous solution containing from about 0.01 to about 10 weight percent of a surfactant comprising alkyl polyethylene oxide sulfates having 8 to 9 carbon atoms in the alkyl radical and from 1 to 5 ethylene oxide groups per molecule, said aqueous solution and said carbon dioxide being injected into said formation at a pressure above about 1,500 p.s.i. and above said miscible-displacement pressure.

2. The method defined in claim 1 wherein there is injected between about 0.001 and about 1 effective pore volume of said aqueous solution.

3. The method defined in claim 1 wherein said aqueous solution and said carbon dioxide are introduced into said formation at a pressure above about 2,000 p.s.i.

4. The method defined in claim 3 wherein said aqueous solution and said carbon dioxide are introduced into said formation at a pressure above about 2,500 p.s.i.

5. The method defined in claim 1 wherein said aqueous solution is prepared from water, brine or carbonated water.

6. The method of claim 1 wherein said surfactant is exposed to low pH and high salinity conditions in said formation.

7. The method of claim 1 wherein said aqueous solution is prepared from a brine having a salt concentration above about 3 weight percent.

8. The method of claim 1 wherein said aqueous solution is prepared from a brine having a salt concentration about about 10 weight percent.

9. The method defined in claim 1 wherein said aqueous solution and said carbon dioxide are displaced through said formation by a drive fluid comprising water, brine or carbonated water.

10. The method defined in claim 9 wherein said drive fluid is comprised of slugs of carbon dioxide alternated with slugs of water, brine or carbonated water.

11. The method defined in claim 10 wherein said slugs of water, brine or carbonated water contain between about 0.05 and about 5 weight percent of said surfactant.

12. In a method for the recovery of oil from high salinity subterranean oil-bearing formations wherein carbon dioxide is injected into the formation at pressures above the miscible-displacement pressure and is driven through said formation from the injection well to the recovery well by means of a drive fluid, the improvement which comprises:
injecting into said formation not later than the injection of said carbon dioxide from about 0.02 to about 0.2 effective pore volumes of an aqueous solution containing between about 0.1 and about 5 weight percent of a surfactant comprising alkyl polyethylene oxide sulfates having 8 or 9 carbon atoms in the alkyl radical and from 1 to 5 ethylene oxide groups per molecule, said aqueous solution and said carbon dioxide being injected into said formation at a pressure above about 2,500 p.s.i. and above said miscible-displacement pressure.

13. The method of claim 12 wherein said aqueous solution is prepared from a brine having a salt concentration above about 3 weight percent.

14. The method of claim 12 wherein said aqueous solution is prepared from a brine having a salt concentration above about 10 weight percent.

15. The method defined in claim 12 wherein said aqueous solution is prepared from water, brine or carbonated water.

16. The method of claim 12 wherein said drive fluid is water, brine or carbonated water.

17. The method defined in claim 12 wherein said drive fluid is comprised of alternating slugs of brine and carbon dioxide.

18. The method defined in claim 17 wherein said slugs of brine contain between about 0.05 and about 5 weight percent of said surfactant.

* * * * *